Jan. 30, 1923.

A. LAMBLIN.
REMOVABLE MOTOR UNIT WITH AERIAL PROPELLER.
FILED AUG. 1, 1921.

INVENTOR:
Alexandre Lamblin

By Otto Munk
his ATTORNEY.

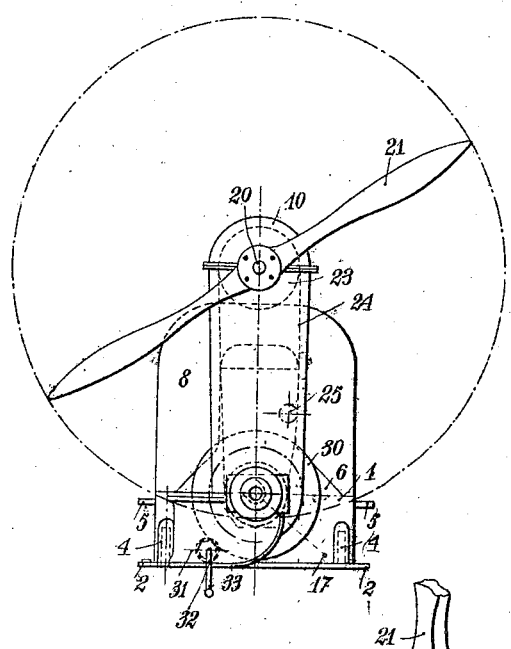
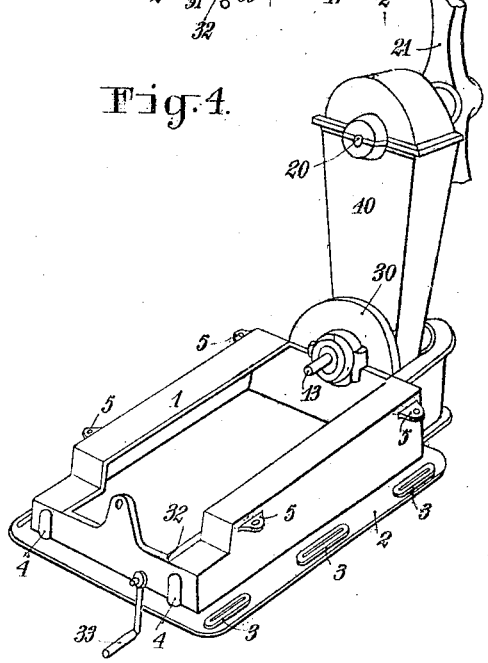

Patented Jan. 30, 1923.

1,443,368

UNITED STATES PATENT OFFICE.

ALEXANDRE LAMBLIN, OF PARIS, FRANCE.

REMOVABLE MOTOR UNIT WITH AERIAL PROPELLER.

Application filed August 1, 1921. Serial No. 489,147.

*To all whom it may concern:*

Be it known that I, ALEXANDRE LAMBLIN, citizen of the Republic of France, residing at Paris, France, have invented certain new and useful Improvements in Removable Motor Units with Aerial Propellers, of which the following is a specification.

The present invention relates to a removable motor unit with an aerial propeller permitting of the propulsion of any vehicle.

This motor unit is mounted on a frame provided with grooved flanges and sockets permitting of its adaptation to the vehicle, suitable devices being provided for ensuring ease of manipulation and permitting a rapid mounting in place of this frame by the aid of lifting appliances.

The frame carries the motor, its accessories and a casing carrying the driving aerial propeller. The motor may be of any type, either electrical, an explosion motor or one worked by heavy oils. As however the electrification of navigable ways will probably closely follow that of railways it will generally be preferable to provide an electromotor which ensures, among other advantages, simpler means for throwing it out of operation and reversal, together with reduced expense, upkeep and amount of space occupied. This electro-motor may be operated by an overhead or underground main, accumulators or any other practical means.

The casing carries the aerial propeller and encloses the devices which ensure the transmission of motion between the driving shaft and the shaft of the propeller. This casing is completely independent of the motor. It is mounted on the frame so as to be able to rotate relatively thereto and the aerial propelled can consequently be raised or lowered according to the obstacles encountered on the journey, such as bridges, tunnels, electric cables, etc. Some times it is not of any use to make the casing capable of rotation relatively to the frame. Thus for example in the case of shallow river craft or that of vehicles which are only at a low height above the track on which they run.

The invention also relates to a particularly advantageous combination of the preceding motor unit, a combination in which the frame of this unit is made in one with the rudder shaft of a boat, in such a manner that the propeller can be utilized for the purpose of steering the boat independently of any rudder, or in combination with a rudder.

Various arrangements according to the present invention are shown, by way of example, in the accompanying drawings in which:

Figures 1, 2 and 3 are respectively a longitudinal elevation, with a partial section of the casing, a rear view and a plan view of the removable motor unit with its aerial propeller. The components shown in dot and dash lines in Figure 1 correspond to a particular position assumed by the casing 10 after rotation about the shaft 13.

Figure 4 is a perspective view of the frame of the motor unit and of the mechanism for driving the casing, the motor and all its accessories being supposed to be removed.

Figure 1:
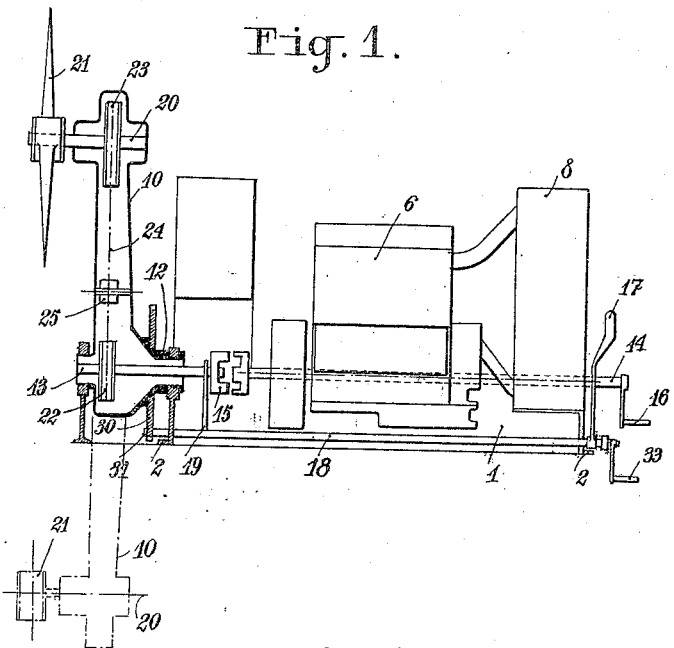
Figure 3:
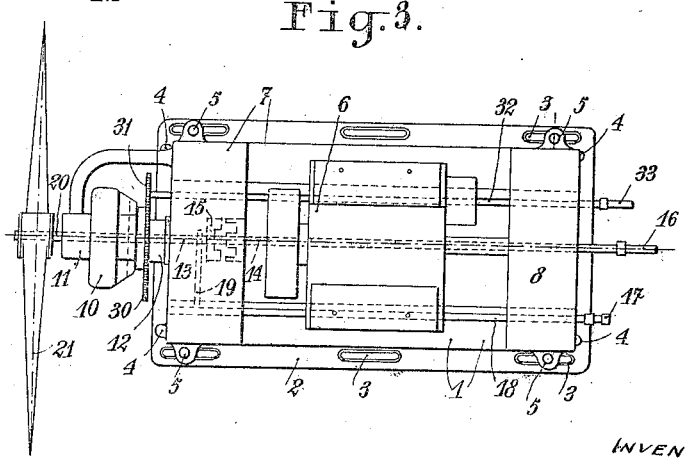

A frame 1 (see Figures 1 to 4) carries a removable motor unit with an aerial propeller. This frame has fixing flanges 2 provided with grooves 3 in which fixing bolts are adapted to engage. It is also provided with hollow bosses 4 open at the lower part and closed at their upper parts. On the sides of the frame 1 are provided lugs 5 for holding this frame in place in a removable manner.

The frame 1 is adapted to carry any kind of motor 6, such as for example an explosion motor, the accessories for this motor, such as its petrol tank, being placed at 7, and its radiator at 8. This motor is provided with a device for reversing it which may be operated by friction, gears or the like. The driving shaft 14 has at its end a starting crank 16.

The casing 10 is entirely independent of the motor and is hermetically closed. It is held by the frame 1 by means of bearings 11 and 12. This casing carries at its lower part a shaft 13, the connection of which with the driving shaft 14 is ensured by a clutch device 15 which is adapted to connect and disconnect the two. The clutch 15 is operated by a suitable device which may consist of for example, the lever 17, the rod 18 and fork 19. The casing 10 carries at its upper part the shaft 20 of the aerial propeller 21. A driving connection ensures the reduction of speed necessary to the best efficiency of the propeller, which connection may consist of a set of gear wheels or of sprocket wheels 22, 23 connected together by a chain 24 and having a stretcher or tightener 25, which ensures the transmission of movement between the shafts 13 and 20. This connection is entirely contained in the interior of the casing 10.

The casing 10 is integral or in one piece with a gear wheel 30 driven by a pinion 31 keyed upon the shaft 32 provided with a crank 33.

The removable motor unit hereinbefore referred to is mounted in the following manner.

To place the unit in position, the frame 1 is hooked by means of the lugs 5 to the hoisting chains of any kind of lifting apparatus. The frame can thus be raised together with the whole of the motor unit which it carries, that is, motor, accessories, casing, aerial propeller, etc. The frame is then rested on the vehicle which is to be propelled such as a boat, the flanges 2 fitting on to suitable fixing plates on the vehicle. The flanges 2 and the fixing plates therefor are then connected by introducing bolts into the grooves 3 and tightening these bolts up. The whole of the motor unit is then connected to the vehicle. The grooves 3 also permit of a longitudinal movement of the motor unit for the purpose of effecting any adjustment necessary to fit it into place.

Instead of connecting the frame to the vehicle by means of flanges such as 2 and grooves 3, the hollow bosses 4 may fit on to projections integral with the vehicle, the fixing in place of the bosses and consequently of the entire motor unit being obtained by the aid of suitable clamping screws.

When the motor unit is fixed by means of its frame to the vehicle to be propelled, the motor may be started by turning the crank 16 which sets the explosion motor in motion. By operating the lever 17 the coupling sleeve 15 is moved and connection between the shafts 13 and 14 is effected. The rotary movement of the driving shaft 14 is thus transmitted to the shaft 13, and to the sprocket wheel 22, which drives the wheel 23 by means of the endless chain 24 and its stretcher or tightener 25. The shaft 20 integral with the wheel 23 produces the rotation of the propeller 21 and thereby the propulsion of the vehicle.

When an obstacle of any kind such as an electric cable, a bridge with a low overhanging arch, etc., is encountered by the vehicle during its journey and is at a height which is lower than that of the upper end of the blades of the propeller, it is necessary to lower the latter. For this purpose, the casing 10 which is independent of the motor, is mounted in its bearings 11 and 12 in such a manner that the same is movable relatively to the general frame of the unit. It suffices to operate the crank 33 which, by means of the shaft 32 and the pinion 31 produces the rotation of the gear wheel 30, with the result that the casing 10 and the whole of the parts which it carries, that is, the shaft of the propeller, the sprocket wheels, etc., is caused to turn in the bearings 11 and 12 about the shaft 13. These various components are capable of assuming in particular the position indicated by dot and dash lines in Figure 1.

The propeller can thus be lowered to a height which is sufficient to allow it to clear the obstacle.

As the casing for the devices which operate the propeller is hermetically closed, perfect lubrication of the internal parts is ensured by immersion, whatever position the propeller may be in, that is, whether the propeller be in its raised or lowered position.

The removable motor unit may not only be used for propulsion on rivers or on land, but it may also be used for driving different kinds of hoisting apparatus, such as small cranes, windlasses, chains with buckets, or cables. For this purpose it suffices to replace the propeller by a suitable pulley.

Figure 5:
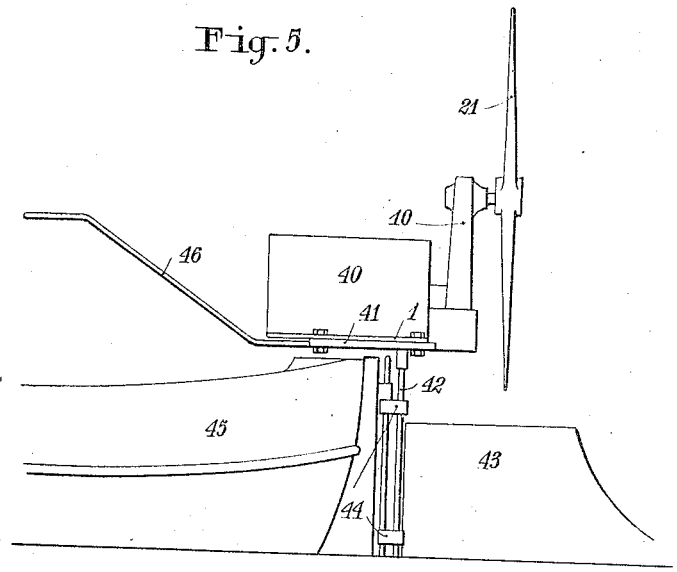
Figure 5 is an elevation showing the combination of the removable motor unit above mentioned with the rudder shaft of a boat.
Figure 6:
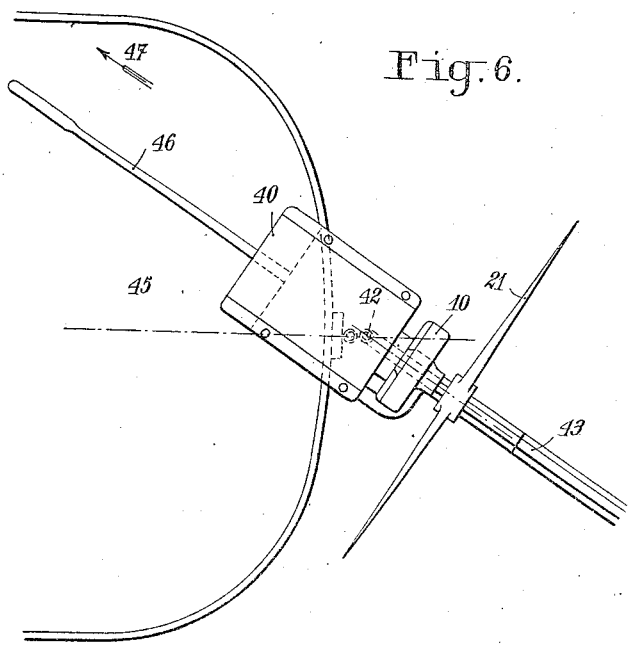
Figure 6 is a plan view of the preceding combination the axis of the aerial propeller being inclined relatively to the axis of movement of the boat so as to effect turning.

A particularly interesting combination in which the removable motor unit hereinbefore described may be employed is shown in Figures 5 and 6. The motor unit is combined with the rudder shaft of a boat for the purpose of effecting both the propulsion and the steering of such boat.

The motor unit and its accessories indicated at 40, and the movable casing 10 carrying the propeller 21 rest by means of the frame 1 on a supporting bracket 41. This bracket 41 is integral with the shaft 42 of the rudder 43. The shaft 42 is connected at 44 to the rear of the boat 45. The bracket is controlled by a steering rod 46.

The arrangement above described works in the following manner. When the boat is to move in a straight line the steering rod 46 is placed in line with the axis of movement of the boat. The propeller 21, driven as has been described above, produces the propulsion of the boat along its axis.

When it is desired to turn the boat, the steering rod 46 is inclined in the direction of the arrow 47, as shown in Figure 6. The steering rod carries with it in this rotation the supporting bracket 41, the shaft 42 of the rudder 43, the rudder itself, the frame 1 and the motor unit which it carries. The propeller 21 consequently assumes the position shown in Figure 6. The propeller and the rudder then combine their action in order to cause the boat to turn.

The case may also be imagined in which the rudder is entirely dispensed with and the propeller alone ensures the steering of the boat. It may be supposed on the contrary that in order to make the boat turn, the shafts 13 and 14 are disconnected from each other. In this case the turning of the boat is ensured in the ordinary way by the rudder 43.

What I claim is:—

1. A removable motor unit having an aerial propeller for propulsion of vehicles on land or on water, said unit comprising a motor and its accessories and a casing carrying said propeller, said casing containing transmitting members connecting the motor shaft to the propeller shaft and capable of turning independently about the motor shaft, and two bearings rigid with the frame of the motor unit and supporting said casing in part and beyond its centre of gravity, whereby said bearings prevent improper movements of said casing.

2. In the combination of a motor and an aerial propeller with a boat, an assembly comprising said motor, its accessories, the aerial propeller and a casing which carries said propeller and contains the transmission members between the motor shaft and the propeller shaft and which casing is adapted to turn independently about the motor shaft, said assembly resting removably on a bracket rigid with the boat rudder, whereby the motor unit may be instantly connected to or separated from the rudder.

In testimony whereof I have affixed my signature.

ALEXANDRE LAMBLIN.